VERTICAL CENTRIFUGAL SPIN COATING METHOD

Filed Nov. 26, 1971

United States Patent Office 3,730,760
Patented May 1, 1973

3,730,760
VERTICAL CENTRIFUGAL SPIN COATING METHOD

Alfred A. Machmiller, San Jose, Calif., assignor to International Business Machines Corporation, Armonk, N.Y.

Filed Nov. 26, 1971, Ser. No. 202,417
Int. Cl. B44d 1/08, 1/06
U.S. Cl. 117—101 14 Claims

ABSTRACT OF THE DISCLOSURE

A method of spin coating both sides of an object such as a disk substrate by mounting the object in a vertical position, exposing the both sides to be coated, vertically rotating the object about its own axis, and centrifugally coating both sides of the object during rotation of the object. Vertical coating eliminates skittering problems associated with horizontal spin coating and allows accurate thickness control.

FIELD OF THE INVENTION

This invention relates to a method for spin coating objects, more particularly, to vertical spin coating of both sides of a disk shaped object for use in data storage devices.

PRIOR ART

Many different types of coating techniques exist in the prior art. Among the coated products made by spin coating techniques include magnetic disk storage devices. Of particular interest is U.S. 3,198,657, by P. D. Kimball et al., issued Aug. 3, 1965 and assigned to the assignee of the present invention, disclosing a spin coating technique. Included within this specification are various coating compositions, particularly synthetic resin based compositions including a magnetizable pigment.

In such prior art techniques, the coating is applied to the horizontally rotating substrate by coating from the outer edge of the substrate toward the inner edge, to initially wet the substrate surface to be coated. Coating occurs by centrifugal distribution of the coating media across the rotating surface.

Prior art coating techniques utilizing horizontal spin coating have shown coating problems when a relatively thick or viscous coating such as in excess of 50 centipoise viscosity is applied to a substrate spinning in excess of 500 r.p.m. This results in a skittering or fly-off effect, preventing an effective uniform wetting of the surface to be coated. In effect, the coating bounces off the spinning surface as it is applied to the surface by an applicator means.

Centrifugal coating also tends to result in a ramp effect, whereby the inner diameter of the coated substrate is thinner in thickness than the outer edges of the coated substrate. Control of this ramp effect is difficult but desirable.

Prior art coating techniques whereby a single side of a substrate is coated at one time also requires a multiplicity of handling steps in the mounting of the substrate, the coating of the substrate, the semicuring or drying of the surface, removal of the substrate and remounting and repeating of the coating cycle. Further, there are practical limits to the thinness of a coating obtainable by horizontal spin coating methods.

Thus, some of the objects of this nvention are:

(1) To develop a coating technique capable of coating both sides of a substrate simultaneously with a synthetic resin paint, preferably including magnetizable pigments;

(2) To economically perform a two-sided coating operation;

(3) To provide a two-sided coating technique permitting ramp control thickness of the coating; and (4) To provide a two-sided coating technique permitting ultra-thin coatings as low as 20 microinches thickness to be applied to a substrate while utilizing a relatively viscous magnetic pigmented synthetic resin coating material.

SUMMARY OF THE INVENTION

These and other objects are met by the vertical spin coating technique of this invention. Briefly, the method described utilizes the steps for example of securing a disk shaped substrate on a rotating means for rotating the disk substrate in a vertical position while exposing the surface areas to be coated on both sides of the substrates. The disk is then rotated about its own axis in a vertical position. Centrifugal coating is achieved by exposing the surface areas on both sides of the substrate to a coating media applied via a coating means during rotation of the substrate. In particular, coating is appled by first prewetting the substrate surface by initially coating from the outer edge to the inner edge of the area to be coated. Initial coating speeds in excess of 3000 r.p.m. may be used.

This invention will more particularly be understood by reference to the preferred embodiments in the general specification, and the general description contained therein, when read in conjunction with the accompanying drawings.

IN THE DRAWINGS

GENERAL DESCRIPTION

(a) Prior art

Figure 1A:
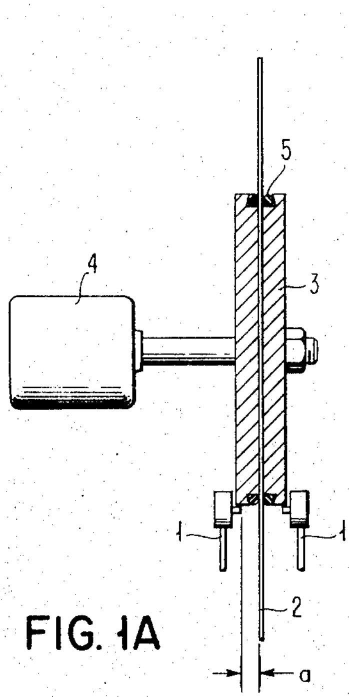
FIG. 1A is a cross-sectional view taken through section AA of FIG. 1B, showing the location of coating guns and the mounting of a disk substrate upon a vertical spin coating means.

For ease of description, both the prior art and the invention utilize a disk shaped substrate. The prior art and this invention is not limited to that shaped substrate.

One of the considerations affecting disk coating formulations is to what thickness a coating of a given viscosity and solids content can be applied to a disk. Generally, reducing either of these items allows a thinner coating to be obtained.

There is a limit to the extent either of these items can be reduced in the attempt to obtain a coating of a given thickness. For example, if the viscosity of the coating is significantly reduced below 50 centipoises, a magnetic coating composition containing iron oxide pigment becomes so thin that the iron oxide no longer remains in suspension. Thus, the formulation is essentially useless.

In horizontal spin coating techniques, such as that described in the Kimball et al. patent, coating is applied to one side of the substrate at a time with the disk in a horizontal plane. The coating is applied over the entire surface of the disk as described therein, and within one embodiment at a speed of between 200 and 500 r.p.m. The coating is then spun off at speeds in the range of 1500 to 3000 r.p.m. Experiments have shown that at speeds greater than 500 r.p.m., skittering occurs during coating application for many coating compositions having the viscosity noted above or greater. Skittering appears to be caused when the coating hits the disk and bounces away without wetting the substrate surface. Consequently, limits exist by conventional horizontal spin coating techniques as to the obtainable thickness control of the coating.

The substrate

Any type of substrate may be utilized. In particular, the substrate is preferred to be aluminum, finished to a high quality mirror-type surface. It is evident that any type of substrate utilized should have a surface of superior finish to the thickness of the coated material, and be compatible for the purpose for which it is intended. Thus, for magnetic storage devices, the substrate should be as smooth as possible to assure as smooth a coating as possible. While aluminum is a preferred material, copper and copper alloys may be utilized, as well as various metals, titanium, glass materials and ceramic materials, and combinations of these. It is evident that the only criteria essentially required is that the material be one wettable by the coating material chosen, and that it be able to withstand the forces generated during the coating action.

The coating media

Various types of synthetic resin coating media are described in the prior art. Examples of synthetic resins include thermosetting resins such as epoxy based resins, epoxy phenolic resins, polyurethanes, and urea formaldehyde resins, and thermoplastic resins, such as polystyrene, polyvinylchloride and polyesters. These materials serve as a vehicle for pigments and other particles. Other types of water and oil based and other based materials are also contemplated. In particular, the type of resins preferred with this invention are described in the patent U.S. 3,058,844, D. D. Johnson et al., issued Oct. 16, 1962 and assigned to the assignee of the present invention. Described in such publication are the compositions of preferred coatings, including the loading of various types of pigment. Particularly, the coating that is preferable would use between 50 and 60% of iron oxide and be between 55 and 65 centipoises viscosity. The method of mixing such coatings is beyond the scope of this invention, and is adequately described in the prior art cited, which is incorporated herein for its teachings, and other prior art.

(b) The invention

Figure 1B:
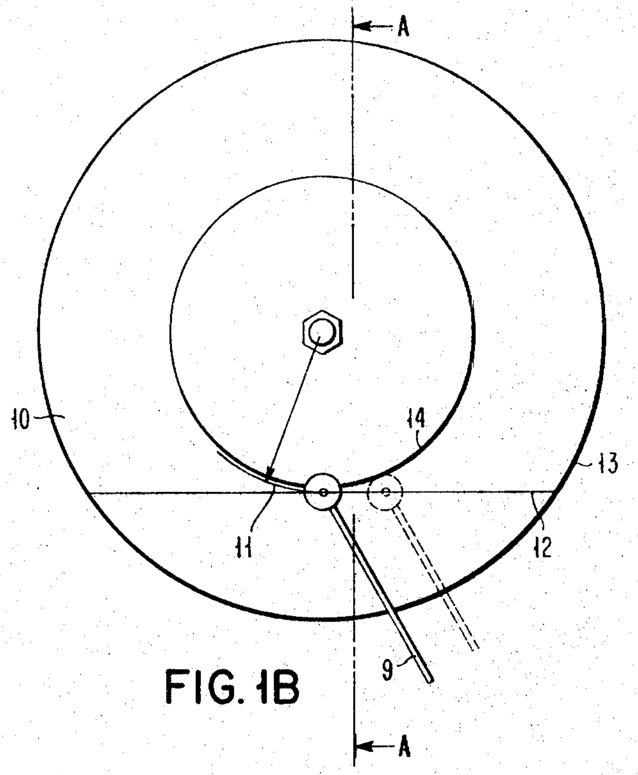
FIG. 1B is a top view of FIG. 1A, showing one proposed path of gun travel in the coating of the substrate.

FIG. 1 shows coating guns 1, directed toward and spaced from substrate 2, which substrate is mounted on a hub 3 attached to a conventional motor 4. The hub system, shown here incorporating an O-ring seal system 5, is of any known vertical rotating means. While the substrate can either be attached vertically or horizontally to the hub, the substrate must be rotated in the vertical position. Hence, it is preferable to initially mount the substrate on a vertical hub. The hub is designed so as to expose the area to be coated, shown in FIG. 1B as the area 10. The position of the coating gun is shown at the final ID position 11. Gun 9 is shown having traversed in this particular embodiment along a chord position 12, running from the OD 13 to the ID 14 of the disk. As particularly noted by the dotted lines, the gun travel may not necessarily require travel from the OD to the ID, although that is an embodiment discussed below.

When the disk is mounted on the hub as shown, various types of coating means can be utilized for applying a coating media to the surface of the disk to be coated. As noted above, the coating media may be a synthetic resin paint and for disk storage purposes, one containing a magnetizable pigment. Preferably still, an epoxy resin base paint is utilized, and still more preferably an epoxy phenolic base paint. The paint should have a viscosity of at least 50 centipoises in order to sufficiently suspend a magnetic coating media, with 55–65 being preferred where magnetic particles such as iron oxide are desired for magnetic coating purposes.

While coating guns 1 are shown in FIG. 1, any type of laminar flow coating application means may be utilized where a steady stream flow of coating media is to be directed toward both surfaces of the disk during the coating operations.

The best type of laminar flow applicator is simply a laminar flow gun designed as known in the art in conjunction with the viscosity of the coating media to be able to deliver a steady stream of material to the surface of the disk. Alternatively however, the coating application means can be spray gun means. Still alternatively, a dipping bath may be utilized (not shown) whereby the substrate, while rotating, is lowered into the coating bath and then removed therefrom. Since coating occurs by centrifugal action, the only requirements that any of these means be capable of delivering a sufficient volume of media to coat the exposed surfaces.

It is important to note that since coating is by centrifugal action, various methods may be utilized to assist in such coating. For example, the rotating substrate can be initially coated from the outer edge to the inner edge of the area to be coated. Further, after such initial coating, the guns may be permitted to dwell at the inner edge to bring additional coating material to the surface or may be moved back toward the outer edge while optionally applying coating material. It is not necessary though preferable that the guns travel the full length from outer to inner edge. The guns must at least travel to the inner edge to achieve coating the inner edge.

As stated, the coating media may be applied by initially wetting the surface of the substrate with the coating media by applying the coating media from the outer edge to the inner edge of the area to be coated. In a preferred embodiment, discussed below, the gun is moved partially along the chord line passing through the ID of the surface to be coated, described previously in conjunction with FIG. 1B. Preferably still, the substrate is rotated in conjunction with application of the above preferred coating of Johnson in conjunction with the pigment loading described at least 800 r.p.m. Contrary to what has been experienced in horizontal spin coating, and as an unusual and unexpected result, skittering does not occur. Indeed, no skittering is noted to speeds in excess of 3000 r.p.m., in contrast to 500 r.p.m. for horizontal spin coating.

Basically then, the range of coating application speeds is between that velocity where coating occurs by centifugal action (as opposed to gravity) and that velocity where laminar media application ceases due to skittering and other fly-off effects. This of course is a function of the viscosity of the material and pressure applied through the nozzle. Such parameters are easily determined by one skilled in the art for the great variety of coating compositions and nozzle designs and viscosities available to such person. Further, one may also wish to apply the coating at a slower speed, and then "spin off" or dry the disk at a higher speed. Such is possible here. Initial coating speeds of over 3000 r.p.m. may also be used.

Figure 2:
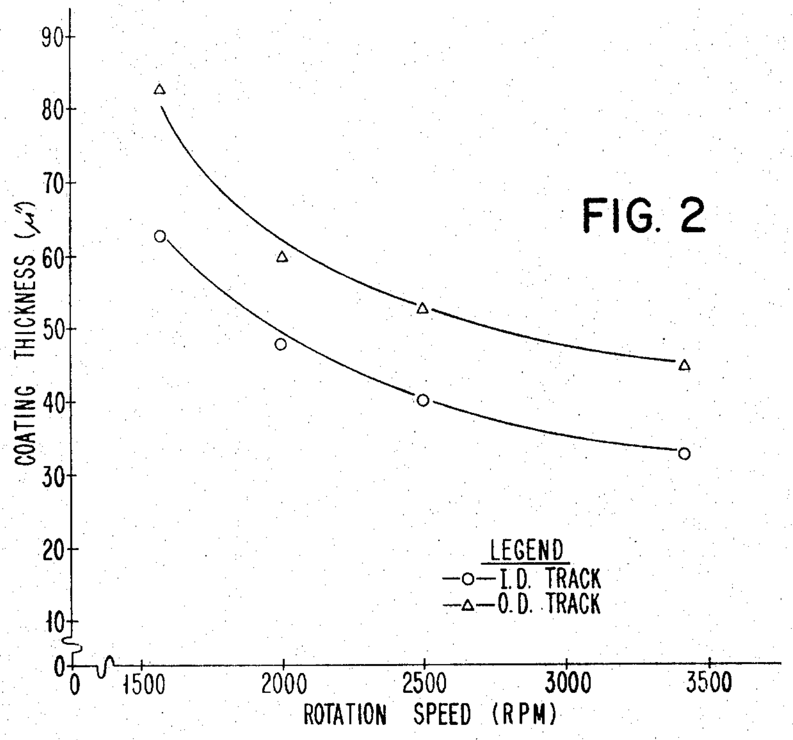
FIG. 2 is a plot of coating thickness in microinches versus disk speed in r.p.m. for a particular disk coating media, showing the type of thinness obtainable and ramp control effect.

In summary then, a clean disk substrate as known in the art is placed in a vertical position on a motorized spindle. The spindle is preferably capable of speeds over 3000 r.p.m. Using conventional coating guns, the disk is coated on both sides simultaneously. The coating is preferably an epoxy-phenolic base, one having a 50 to 60% by weight iron oxide loading at a 55 to 65 centipoise viscosity at room temperature. The disk and the spindle are positioned between the coating guns and a cover is placed about the disk to prevent splatter. The guns are positioned so that the nozzles are preferably approximately one-half inch from the disk surface. The disk is spun at a speed required to yield the desired coating thickness, as determined from a plot shown for example in FIG. 2. As shown in FIG. 2, two curves show coating thickness versus disk speed of coating. The ID and the OD tracks of the disks have been measured. This is essentially a linearly changing thickness measure, indicating what is known as the ramp effect—thinner at ID, thicker at OD. The ramp effect is controlled by the degree to which material is brought to the surface of the disk, whether the guns are moved from the OD to the ID, dwell within the ID, then brought back, and just when termination of flow occurs. All these factors are readily determinable by those skilled in the art for the particular purposes intended. The preferred track position of the gun is shown in FIG. 1B. The guns are opened as they begin to move toward the disk ID. The guns are moved over the two inch wide track on a 14" disk in approximately 1.5 seconds. When the guns are brought to the ID, they are allowed to dwell approximately .5 second before being shut off. Thus, approximately 6.0 milliliters of coating are applied to each side of the disk during the two seconds the guns are open. In this particular case, at the time the coating has been shut off, the disk is not entirely covered. Centrifugal force however will take care of the balance of the coating.

This coating technique allows accurate control of the ramp thickness as shown in FIG. 2. Picking the r.p.m. of application determines thickness and ramp control. Initial coating has occurred at speeds in excess of 3000 r.p.m. Thus, single speed coating is available although multi-speed coating techniques are also utilizable here. The basic advantage of this invention over the prior art is that a coating material of a high solids content and viscosity can be applied thinner if coated at the higher r.p.m. which is possible if done in the vertical spin coating station. Skittering for some reason not fully known does not appear to be a problem in the vertical coating situation.

Ramp control is achieved while using high pigment content synthetic resin paints. Two sided coating is thus achieved simultaneously with coating control, resulting in improved economics. Coatings as thin as 20 microinches are achievable, and thinner coatings may be made if desired.

While this invention has been broadly described, other variations are determinable to those skilled in the art.

What is claimed is:

1. A method of spin coating both sides of a disk shaped substrate comprising the steps of:

securing the disk shaped substrate upon a rotating means for rotating the substrate in a vertical position while exposing the surface areas to be coated on both sides of the substrate;

rotating the substrate in a vertical position at a velocity of at least 800 r.p.m.; and centrifugally coating the exposed surface areas on both sides of the substrate by applying a coating media of at least 50 cps. viscosity by coating application means to both sides of the substrate during rotation of the substrate.

2. The method of claim 1 wherein the coating media is a synthetic resin paint.

3. The method of claim 1 wherein the coating media is a synthetic resin paint containing a magnetizable pigment.

4. The method of claim 1 wherein the coating media is an epoxy-resin based paint.

5. The method of claim 1 wherein the coating media is an epoxy-phenolic resin based paint.

6. The method of claim 1 wherein the coating is applied by laminar flow coating application means.

7. The method of claim 6 wherein the coating application means comprises a laminar flow gun.

8. The method of claim 1 wherein the coating application means is a spray gun.

9. The method of claim 1 wherein the coating application means is a dipping bath and the rotating substrate is lowered into the dipping bath to apply the coating media and then removed from the dipping bath to centrifugally distribute the coating upon the exposed surfaces.

10. The method of claim 1 wherein the coating media is applied by initially wetting the surface of the substrate with the coating media by applying the coating media from the outer edge to the inner edge of the area to be coated.

11. The method of claim 10 including continuing to apply coating from the inner edge towards the outer edge of the area to be coated.

12. The method of claim 1 wherein the coating media is applied along a chord line passing through the inner edge of the substrate area to be coated.

13. The method of claim 1 wherein the substrate is rotated at a velocity between that velocity where centrifugal media distribution occurs and that velocity where skittering occurs.

14. The method of claim 1 wherein the substrate is rotated at a slower speed during coating media application and a higher speed after such coating media application.

References Cited

UNITED STATES PATENTS

| | | | |
|---|---|---|---|
| 3,428,044 | 2/1969 | Whitehead et al. | 117—101 X |
| 2,039,548 | 5/1936 | Moore | 117—40 |
| 3,058,844 | 10/1962 | Johnson et al. | 117—235 |

EDWARD G. WHITBY, Primary Examiner

U.S. Cl. X.R.

117—234, 104 R, 105.3, 161 ZB